United States Patent
Mower et al.

(10) Patent No.: US 7,430,198 B2
(45) Date of Patent: Sep. 30, 2008

(54) RF UTILIZATION CALCULATION AND REPORTING METHOD FOR 802.11 WIRELESS LOCAL AREA NETWORKS

(75) Inventors: Carl Mower, San Jose, CA (US); Jason Hatashita, San Jose, CA (US); Tina Wu, Cupertino, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 491 days.

(21) Appl. No.: 11/138,587

(22) Filed: May 26, 2005

(65) Prior Publication Data

US 2006/0268728 A1 Nov. 30, 2006

(51) Int. Cl.
*H04L 12/42* (2006.01)
(52) U.S. Cl. ............... 370/349; 370/253; 370/233; 370/234
(58) Field of Classification Search ............... 370/229, 370/230, 230.1, 231, 232, 233, 234, 235, 370/328, 346, 395.21, 252, 253
See application file for complete search history.

(56) References Cited

U.S. PATENT DOCUMENTS

| | | | | |
|---|---|---|---|---|
| 6,697,337 | B1 * | 2/2004 | Cafarelli et al. | 370/253 |
| 2002/0122385 | A1 | 9/2002 | Banerjee | |
| 2002/0154602 | A1 | 10/2002 | Garcia-Luna-Aceves et al. | |
| 2003/0198184 | A1 | 10/2003 | Huang et al. | |
| 2005/0002372 | A1 * | 1/2005 | Rune et al. | 370/346 |
| 2005/0111403 | A1 * | 5/2005 | Rudolf et al. | 370/328 |
| 2006/0233178 | A1 * | 10/2006 | Lu et al. | 370/395.21 |

FOREIGN PATENT DOCUMENTS

EP 1447937 8/2004

* cited by examiner

*Primary Examiner*—Duc Nguyen
*Assistant Examiner*—Wayne Cai
(74) *Attorney, Agent, or Firm*—Fay Kaplun & Marcin, LLP (57) ABSTRACT

A radio frequency exchange utilization calculation method in wireless medium that comprises identifying a plurality of packet counters pertaining to each of a plurality of transmission speeds and to each of a plurality of components of the wireless medium, identifying a plurality of octet counters pertaining to each of a plurality of transmission speeds and to each of a plurality of components of the wireless medium, incrementing each packet counter by one in accordance to the speed a data packet is transmitted, incrementing each plurality of octet counters by a number of octets in the data packet, calculating a packet weighted effective bit rate, calculating an octet weighted effective bit rate, calculating a total data exchanged, and calculating a percentage for the radio frequency exchange performance.

20 Claims, 9 Drawing Sheets

| rate | pkts | octets | product |
|---|---|---|---|
| 1 | 10589 | 198708 | 198708 |
| 2 | 28734 | 254878 | 509756 |
| 5.5 | 5981 | 48002 | 264011 |
| 11 | 1098 | 11098 | 122078 |
| sum: | 46402 | 512686 | 1094553 |

2.13 eff bit rate (octet weighted)
4.10 total bits moved
52% utilization

| rate | pkts | octets | product |
|---|---|---|---|
| 1 | 10589 | 198708 | 198708 |
| 2 | 28734 | 254878 | 509756 |
| 5.5 | 5981 | 48002 | 264011 |
| 11 | 1098 | 11098 | 122078 |
| sum: | 46402 | 512686 | 1094553 |

2.13 eff bit rate (octet weighted)
4.10 total bits moved
52% utilization

FIG. 9

RF UTILIZATION CALCULATION AND REPORTING METHOD FOR 802.11 WIRELESS LOCAL AREA NETWORKS

TECHNICAL FIELD

The present invention is related to wireless networks. More precisely, the current invention is related to an RF utilization calculation and reporting method for 802.11 wireless local area networks.

BACKGROUND OF THE INVENTION

Institute of Electrical Engineers (IEEE) 802.11 networks are currently the most popular wireless local area network (WLAN) products on the market. The technology is mature, and the prices are significantly lower than at its inception. Therefore, IEEE 802.11 products fulfill the needs of many consumers. End consumers use IEEE 802.11 products for mobile networking, both in the residential and business markets, to enjoy undeterred Internet access. Internet Service Providers, realizing the significant cost savings that wireless links offer when compared to classical access techniques (cable and xDSL), embrace the technology as an alternative for providing last mile broadband Internet access. Various companies are using IEEE 802.11 off-the-shelf products to provide wireless data access to devices without a need for special cabling, e.g. remote surveillance cameras, cordless speakers, etc. WLANs make it possible to network historical buildings where it is impossible or impractical to use cables. Researchers in ad-hoc networking are finally offered a high data rate, reliable, low cost implementation radio interface for their testbeds.

A widespread misconception about IEEE 802.11 products regards their throughput. For example, for 802.11b products, their throughput is believed to be 11 Mbps. However, the 11 Mbps so hugely advertised on all IEEE 802.11b products only refers to the radio data rate (of only a part) of the packets. The throughput offered to a user of IEEE 802.11b technology is significantly different. For example, with no transmission errors and 1460 byte sized packets, the throughput of an "11 Mbps" system is just 6.1 Mbps. The efficiency is significantly lower for smaller packet sizes. The efficiency of IEEE 802.11 wireless LANs is in sharp contrast to the efficiency of wired LANs where, for example, a 10 Mbps Ethernet (802.3) link offers users almost 10 Mbps.

The throughput of IEEE 802.11 networks is most often calculated in the absence of transmission errors and for various physical layers, data rates, and packet sizes. The calculation of throughput is more than a simple exercise. It is a mandatory part of provisioning for any system based on 802.11 technology (whether in ad-hoc or infrastructure mode). It is of large practical importance to asses the theoretical maximum throughput for the present applications.

A multitude of variables affect radio-link utilization on 802.11 wireless LAN networks. Finding a concise representation of radio-link performance and utilization has been an on-going problem in this technology, especially while trying to compute the actual average throughput utilization. The methods to asses utilization are only estimative, no matter that individual data packets are transmitted at the same or at a different rate.

What is needed is a method for the exact calculation of throughput and utilization and implicitly an exact assessment about the health of transmission, no matter that the data packets are transmitted at the same or at different rates.

BRIEF SUMMARY OF THE INVENTION

The present invention proposes a method for the calculation and reporting the general performance of data transmissions in one aggregate measure.

The present invention proposes a method of calculating the RF utilization for an 802.11 WLAN network link.

A radio frequency exchange utilization calculation method in a wireless medium comprises identifying a plurality of packet counters pertaining to each of a plurality of transmission speeds and to each of a plurality of components of the wireless medium, identifying a plurality of octet counters pertaining to each of a plurality of transmission speeds and to each of a plurality of components of the wireless medium, incrementing each of the plurality of packet counters by one in accordance to the speed a data packet is transmitted, incrementing each of a plurality of octet counters by a number of octets in the data packet, calculating a packet weighted effective bit rate, calculating an octet weighted effective bit rate, calculating a total data exchanged, and calculating a percentage for the radio frequency exchange performance.

BRIEF DESCRIPTION OF THE DRAWINGS

The present invention is described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE PREFERRED EMBODIMENTS OF THE INVENTION

The following detailed description is merely exemplary in nature and is not intended to limit the invention, applications and uses of the invention. Furthermore, the invention is not intended to be limited by any expressed or implied theory presented in the preceding technical field, background, brief summary or the following detailed description.

In the following detailed description of the preferred embodiments, reference is made to the accompanying drawings that form a part thereof, and in which are shown by way of illustration specific embodiments in which the invention may be practiced. It is to be understood that other embodiments may be utilized and structural changes may be made without departing from the scope of the present invention.

802.11 wireless LANs operate at a variety of bit-speeds, depending on the RF characteristics currently experienced between transmitter and receiver. For 802.11b WLANs the possible transmission rates are 1, 2, 5.5, and 11 M bits/sec. For the 802.11a WLANs the possible speeds are 6, 9, 12, 18, 22, 24, 36, 48, and 54 M bits/sec. Higher transmission rates are achieved under better RF conditions. 802.11 standards cause transmissions to occur at lower speeds, (on a per-packet basis), as triggered by degraded RF conditions.

Indicating the 'health' of such transmissions in aggregate is complicated by the fact that each individual data packet may be transmitted at a rate different than a prior data packet.

The present invention proposes a method to calculate and report the general performance of data transmissions in one aggregate measure.

Throughput calculation methods that are currently used measure the idle "busy" time of the access ports or calculate the time necessary to transfer all traffic from a time duration and divide this number by this time duration. Other methods rely on raw counters that measure the bits transmitted and received similarly as it is done for Ethernet networks or measure the number of data packets sent and received.

In the relatively short life of wireless local area networks, the first commercially available IEEE 802.11 based wireless LAN being introduced in 1995, the technology has moved from distributed (or access point-based) to centralized architecture.

While many organizations realized great operational and service values using the distributed network topology, today's commercially available solutions challenge organizations with their inherent limitations and acquisition cost.

A new approach, that uses a wireless switch system, is a wireless LAN architecture with intelligence centralized at the switch. This new architecture brings wireless LAN technology to parity with the wired network, providing a vast array of features and benefits not possible to implement in historical wireless LAN access point architecture, including: reduced installation requirements ("Access Ports" vs. access points), simplified management, consolidation of capabilities to provide secure, wireless mobile networking, collapse of network services to provide management and security provisioning, and moving the intelligence securely back in the closet, among others.

Figure 1:
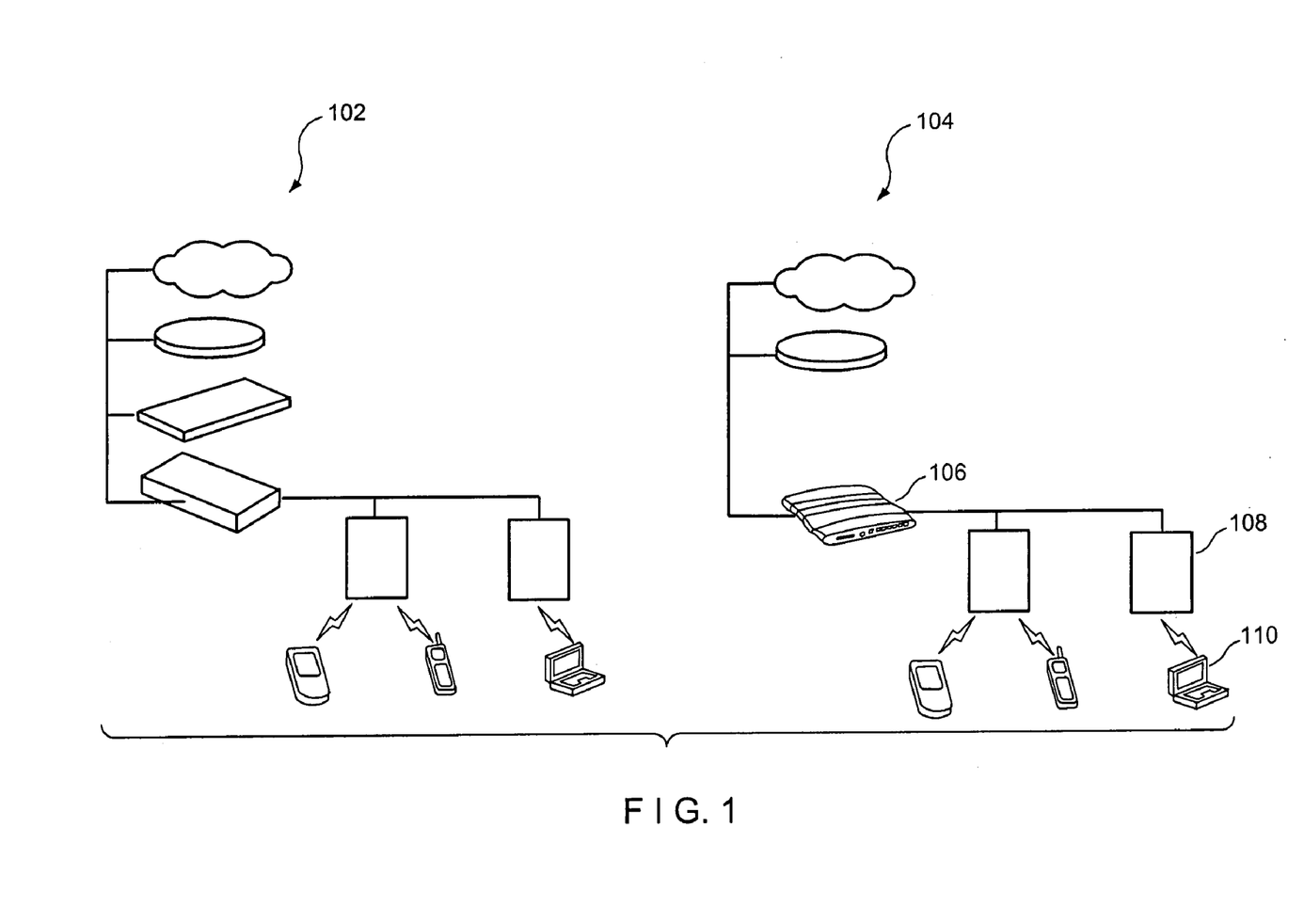
FIG. 1 illustrates examples of switched wireless network architectures.

FIG. 1 illustrates examples of switched wireless network architectures.

FIG. 1 illustrates two switch wireless network architectures, both an "overlay" model switched wireless network architectures, 102 and 104, where access ports connect to the wireless switch through an existing Ethernet switching fabric. The wireless switch in arrangement 102 is also equipped with Ethernet switching capabilities, differentiated as more of a standalone, edge or access layer Wireless Switch.

The following compares traditional wireless LAN deployments such as 102 with the switch-based architecture 104 and the benefits derived from it.

Many organizations seeking to deploy wireless LAN technology likely cite the total cost of ownership (TCO) as a key barrier. Contributing to this is the understanding that wireless LAN deployment involves more than connecting an access point to the wired fabric of an enterprise, and providing laptops or other clients with a wireless card.

A realistic assessment of the TCO of an access point-based wireless LAN can be broken into the following key components: installation costs, equipment acquisitions and operational costs, and expansions and migration costs.

The installation costs are the sum of electric wiring, installation (mounting access points), wired LAN design changes, planning/design support, configuration support, network management support. Because each access point on the wireless LAN needs to be configured and managed as a separate network entity, these costs can be substantial.

The growth in acceptance and use of WLANs requires additional WLAN specific services to the wired network for security, management and policy enforcement purposes. The cost for these services is incremental to the wireless equipment purchase. Additional costs are often required to meet wireless LAN and mobile application needs, including mobile device battery life management, application and connection persistence, WLAN security, and quality of service (roaming, range, throughput, etc.). While difficult to measure, these costs are critical to the wireless LAN.

As far as the expansion and migration costs are concerned, since inception, wireless LAN technologies have evolved to meet new customer and market requirements, including radio speed, security options, and performance standards. Access point architectures are inherently tied to an embedded radio (s) design, and therefore have restricted amounts of power (CPU speed, memory, etc.). It is not possible to migrate to emerging technology since the chassis requires expansion and expensive modification. The result is a "rip and replace" requirement for new WLAN security, management, QoS and other critical management components.

The switched wireless networking architecture 104 presented above introduced a solution to the above challenges by introducing switched wireless networking. This architecture is based on a central intelligence packet switched infrastructure model which includes two critical hardware components: the wireless switch 106 for media independent, switch-based wireless networking, and access ports 108 for wireless client communication access.

Figure 2:
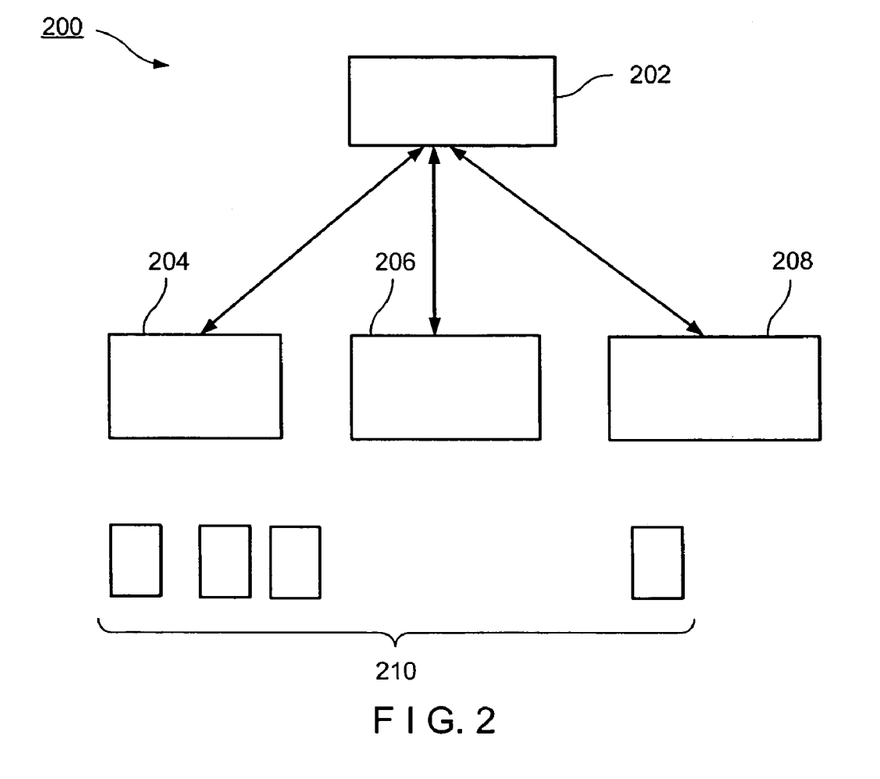
FIG. 2 illustrates a high level view of a switched wireless network architecture provisioned in accordance with the means of the present invention.

FIG. 2 illustrates a high level view of a switched wireless network architecture provisioned in accordance with the means of the present invention.

Wireless LAN 200 comprises a wireless switch 202, a plurality of APs 204, 206, and 208 deployed around the wireless switch 202. Each AP has specific data transfer capabilities, and for exemplary purposes, the AP 204 has data transfer capabilities in the IEEE 802.11b data range, AP 206 has data transfer capabilities in IEEE 802.11a and b data ranges, and AP 208 has data transfer capabilities in IEEE 802.11a and a/b data ranges. A plurality of mobile units 210 is situated within range of APs 204 to 208. Each AP comprises one or more radios. The same is valid for the wireless switch 202 and the MUs. A plurality of counters is incorporated in each and every element illustrated in FIG. 2. An array of packet counters is implemented, such as any packet counter well known in the art, the array comprising one counter for each possible transmission speed. The range of transmission speeds monitored is between 1 Mbit/sec to 54 Mbit/sec. The counters are 1 byte or octet counters.

For the purposes of this example, MU 1 pertaining to the plurality of MUs 210 is discussed. MU 1 associates to one of the radios comprised by AP 204. The data packets transmitted from the MU are sent to a radio comprised by AP 204 and from there to switch 202. Each element of the wireless medium, such as the switch, the APs, and the MUs comprise a plurality of counters that are either packet counters or octet counters. An incoming data packet from the an MU will be counted by the counters in this particular example four times: once by the counters comprised in the MU, once by the counters comprised by the radios, once by the counters comprised by the wireless switch, and once by the counters monitoring the data exchange in the WLAN. For the purposes of the present example an AP is a radio that can comprise for example a radio of type "b", two radios, one of type "a" and one of type "b", or two radios, one of type "a" and one of type "b/g".

A plurality of octet counters are comprises as well by each element of the wireless medium illustrated in FIG. 2. There is one possible counter for each possible transmission or reception speed. These counters report the total number of 8-bit bytes or octets that have been transmitted or received at any given speed.

As the packets transmitted from an MU are received by a portal, each and every packet causes four different packet counters to increment by +1: the counters corresponding to the MU, the portal, the WLAN, and a special entry in a WLAN table representing the entire switch.

Likewise, as the packets transmitted from a portal are transmitted and received by an MU, each and every packet causes four different packet counters to increment by +1. In a similar fashion, each and every packet transmitted or received increments four different octet counters by the number of bytes in that packet.

The plurality of links illustrated in FIG. 2 are paths facilitating the data exchange, wheatear it is transmission, reception or both.

Figure 3:
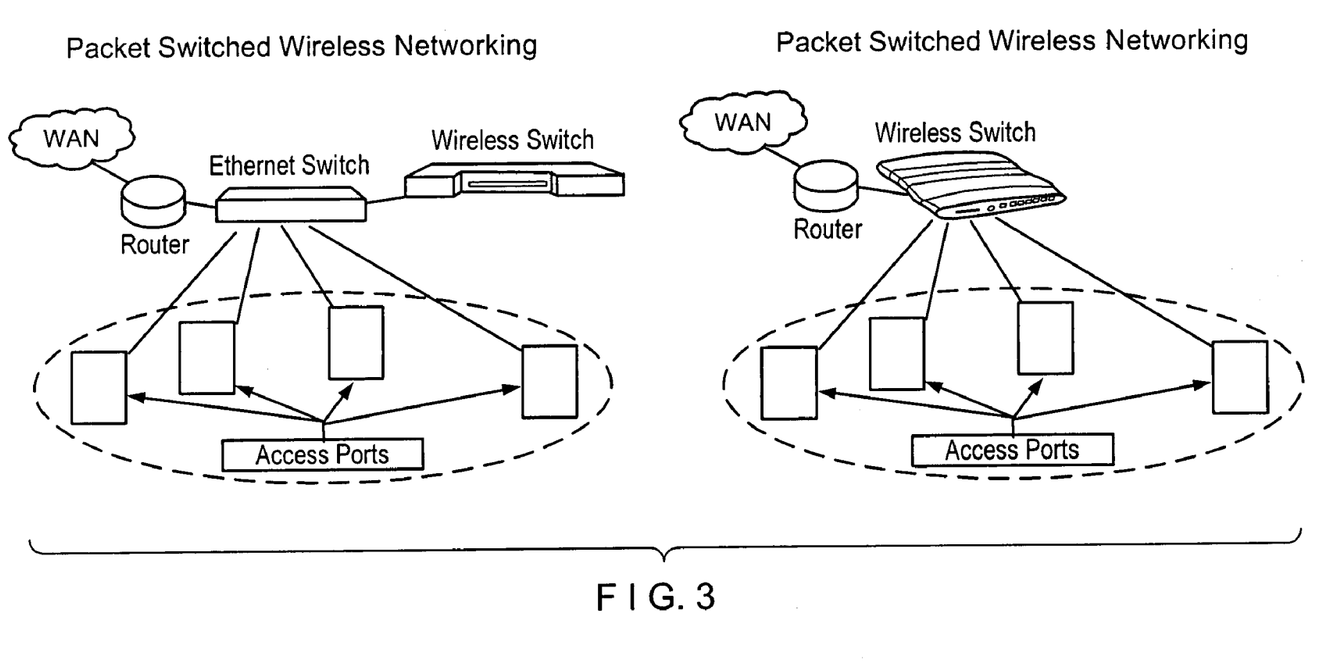
FIG. 3 illustrates further examples for wireless access ports in different configurations within a wireless network.

FIG. 3 illustrates further examples for wireless access ports in different configurations.

In the architecture 304 the wireless switch products follow the same model, providing core functionality as an aggregation of Access Ports, bridging wireless traffic to the wired Ethernet network along with additional upper layer services such as management and security. As a central policy enforcer, the Wireless Switch products create a class of service for a group of wireless users by designating the kind of network access, type of wireless LAN security, and the Quality of Service that will be provided. Sharing the same higher-layer services as Ethernet switches, wireless switch products provide extensive wired LAN support, thus fully integrating wireless traffic into the network to provide seamless traffic flow.

The above wireless switch products include a robust security suite to protect mobile data, applications and the network through wireless VLAN and other proven mobile security technologies. Ethernet-based power solutions reduce deployment, installation time and costs. Management software provides greater control, flexibility and enhanced services.

Figure 4:
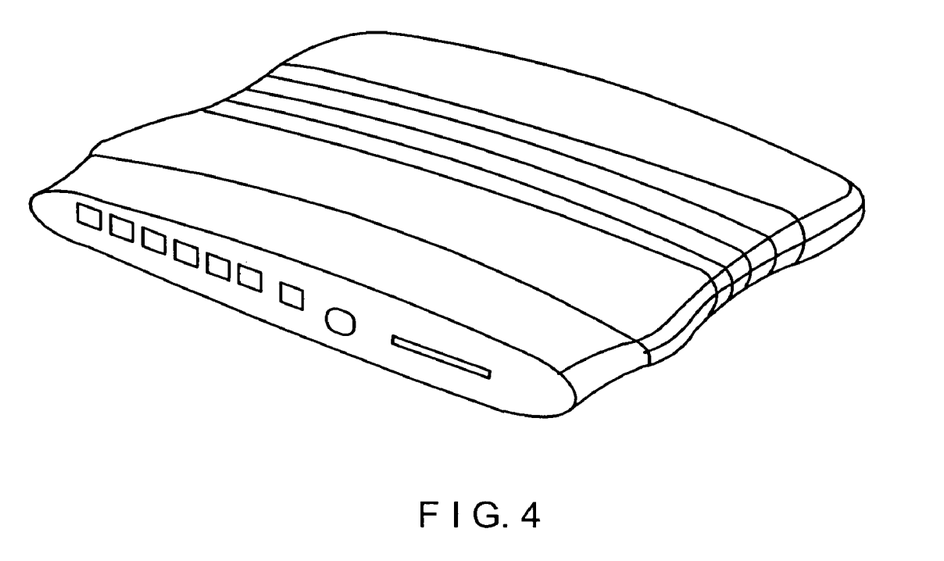
FIG. 4 illustrates a WLAN switch that incorporates means performing the method of the present invention.

FIG. 4 illustrates a WLAN switch that incorporates means performing the method of the present invention.

The wireless switch system 400 goes far beyond the traditional dual-mode wireless LAN approach, providing an architecture that can grow with the requirements. The media-independence of the wireless switch ensures that the system is open, extensible, and expandable. This enables seamless migration to new radio technologies without requiring the purchase of a new wireless switch, providing continuous return on investment as the network evolves.

The concept of using a wireless switch to centralize the management of a wireless LAN has been validated quickly in the networking world. Many new companies and network appliance vendors that market VPN concentrators and policy management servers have adopted this new trend and have started to re-brand their products as Wireless Switches—without actually providing 802.11 packet-switch functionality.

A comparison between an Ethernet switch ports based architecture 302 vs. wireless access ports based architecture 304 reveals that at the hardware level, the wireless switch may not contain the Ethernet ports typically found on an Ethernet switch, but instead utilizes wireless Access Ports. The Access Ports perform the same function as Ethernet ports in bridging traffic, but bridge wireless traffic instead of wired traffic. Wireless traffic in the 802.11 frame format from a wireless device is tunneled back to the Wireless Switch with an Ethernet frame header wrapped around the original 802.11 frame header and contents. The exemplary switch of FIG. 4 on the other hand, has seven (7) 10/100 Ethernet ports to provide both wired connectivity as well as wireless network connectivity through the Access Ports.

In configuration of FIG. 4 the centralized intelligence and value at the edge access ports, in combination with the wireless switch, replace the traditional distributed intelligence access points of a typical WLAN architecture. The functionality of a traditional access point is centralized in the Wireless Switch along with additional features that are unattainable in a distributed model, resulting in a low-cost Access Port passed at the edge. By using the Wireless Switch to manage Access Ports, the Wireless Switch based System 304 is able to realize a number of benefits that reduce the total cost of ownership of a WLAN.

The Wireless Switch serves as a central point of management for the WLAN, so network administrators only need to perform configurations at the Wireless Switch level instead of at each traditional access point. For example, to configure multiple Access Ports, network administrators simply have to configure an Access Port Policy in the Wireless Switch that can then be applied to the specified Access Ports with a few mouse clicks on the graphical user interface (GUI). The Wireless Switch automatically pushes the latest version of firmware out to Access Ports as they are plugged into the network. With the standards-based software and hardware architecture of the Wireless Switch products, a greater set of features and functionalities are enabled. Compared to the proprietary software and hardware of other access points that need a specialized set of designers and developers, the standards-based model of the Wireless Switch products is much more extensible. In addition the architecture 304 displays "Plug-and-Play" for Ease of Installation, enables Cost-Effective Migration.

Feature-Enabler vs. Wireless Switch: Many enterprises have deployed WLANs with a traditional access point-based architecture while relying on feature-enablers to provide additional security. BlueSocket's Wireless Gateway and ReefEdge's Edge Controller can also manage wireless bandwidth by enforcing restrictions on bandwidth usage. However, none of these feature-enablers provide a complete solution for managing and securing a WLAN as well as switching functionality to integrate the wired and wireless network.

These feature-enablers are placed at the Distribution Layer of the network architecture to integrate "fat" access points in the ceiling into the wired infrastructure. Although the network schematic of a feature-enabler with access points looks similar to the switched-wireless network schematic, the key difference is that the access points are still "smart" entities and require configuration, management and support. In addition, the few additional services that these devices provide add significant time and labor costs due to the overhead associated with properly installing and configuring these services with the access points and the rest of the network.

Due to its innovative architecture, the Wireless Switch System of the present invention provides much of the additional functionality of a feature-enabler, along with a variety of management and switching features, without associated cost. As the central point of aggregation for Access Ports on the network, the Wireless Switch enables a network administrator to effectively manage and secure a WLAN while lowering the total cost of ownership.

More robust statistics improve the visibility, management and monitoring of the wireless system—including per Mobile Unit, Wireless LAN and individual Switch; statistics are available through the management console and SNMP, including Packets per second, Data Packets and bytes per second, Management packets and bytes per second (both receive and transmit), % Retries and Retries per second, System packets per second and total Wired LAN packets per second. The switch provides several key RF statistics that help in real-time monitoring of the network health. These statistics (such as throughput, percentage of retries, average signal strength and SNRs on per MU, Access Port, and Switch basis) are updated frequently and available via all supported interfaces (CLI, Web, SNMP). Key system traps are also supported. Traps can be configured when any of the key system performance parameters fall outside the user configured bounds. The traps can be forwarded to any enterprise management system and provide early notification of network problems related to Access Port adoption, Mobile Unit association and system resets.

As far as system statistics are concerned the switch of the present invention provides extensive system statistical information to enable continuous or periodic monitoring of performance variables. Most of the statistical information is also available through SNMP.

The switch provides system logging capabilities that are configurable through any of the interfaces. System logs are stored in a text file for viewing. The severity of the logging level (ranging from "Debug" to "Emergency") can be configured.

In addition to local logging, support for Syslog is also supported. All log files can be sent to an external Syslog server. Extensive SNMP MIBs (Management Information Bases) provided with the switch facilitate remote monitoring, troubleshooting and management. Supported MIBs include: MIB II (RFC 1213), Ping MIB (RFC 2925), Traceroute MIB (RFC 2925) and Symbol MIB (Proprietary).

SNMP support in the switch allows remote monitoring of system health and key RF system parameters. In addition, SNMP support for updating configuration and firmware image is also provided.

Traps that monitor the system status are available in the switch and can be sent to any registered SNMP client. Traps include: Access Port Adopted/Unadopted; Mobile Unit Associated/Disassociated; Access Control List (ACL) violation; SNMP authentication failures.

Enterprise Network Management systems (EMS) such as HP Openview, etc., can be used to monitor the switch system in distributed environments.

This invention devised a new method to calculate and report the general performance of such transmissions in one aggregate measure. Assume that an array of 'packet' counters exists one counter for each possible transmission or reception speed: 1, 2, 5.5, 6, 9, 11, 12, 18, 22, 24, 36, 48, and 54 M bit/sec. These values shown are for each Portal, (radio), but there are similar counters for each MU (mobile unit), and each WLAN (wireless LAN) and the switch as a whole. This is true for all the counters shown in this discussion. Similar arrays of 'octet' counters are assumed to exist, one counter for each possible transmission speed.

For each packet transmitted, the appropriate 'packet' counter is incremented by +1, according to the speed the packet was actually transmitted. Likewise, the appropriate 'octet' counter is incremented by the number of octets in that packet.

At any point in time, an effective bit rate can be calculated using the following succession of steps: Multiplying the number of packets transmitted/received at a given data rate by that data rate; Summing those products for all possible data rates; Dividing that sum by the total number of packets across all rates. The resulting value is called "packet-weighted effective bit rate".

A more accurate method is to perform the same calculation, except using octet counters rather than packet counters, in the following succession of steps: multiply the number of packets transmitted/received at a given data rate by that data rate; sum those products for all possible data rates; and divide that sum by the total number of packets across all rates. The resulting value is called "octet-weighted effective bit rate". This value is more accurate, since the prior takes no account of packet size.

Utilization is calculated over a prescribed period of time by performing the following succession of steps: Over the given period of time calculating the "effective bit rate", Over the same period of time calculating the total number of bits transmitted/received, dividing the effective bit rate by the total bits moved which will yield the approximate percentage utilization of that radio medium.

Figure 6A:
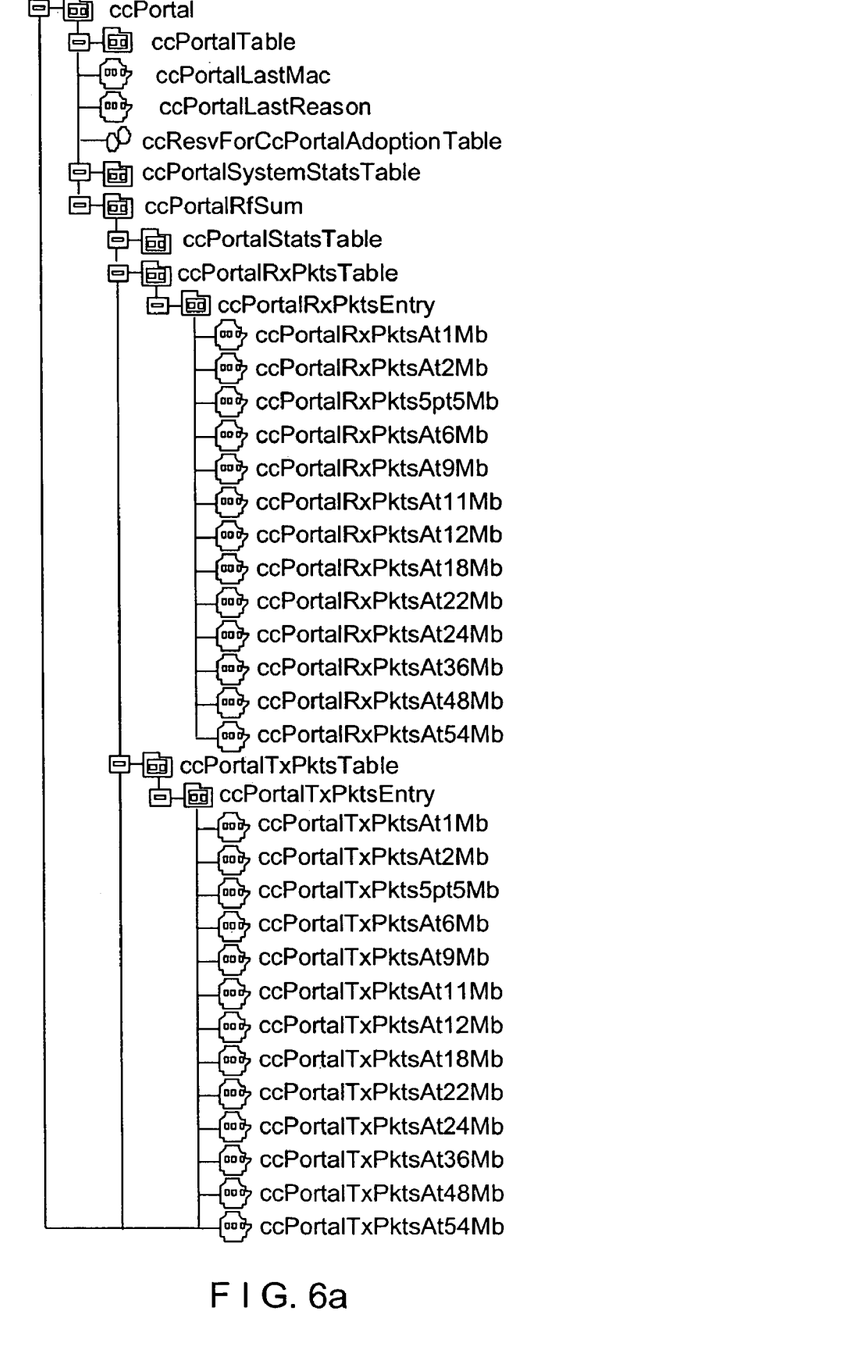
FIG. 6a is a screen shot of SNMP variables found in the ccPortal sub-tree of a proposed MIB.

FIG. 6a is a screen shot of SNMP variables found in the ccPortal sub-tree of a proposed MIB.

A set of industry standard tools can be used to display and report the data that indicates the health of the network. FIG. 6a illustrates a screen shot of a standard tree that reports data collected for a portal. In the context of the present invention, the terms "tree" or "sub-tree" are used to mean a fraction of a SNMP MIB. All MIB variables in the known universe fit into a universal tree. While a collection of variables are literally a sub-tree, they are and can be referred to simply as a collection of variables, a tree or sub-tree.

Figure 6B:
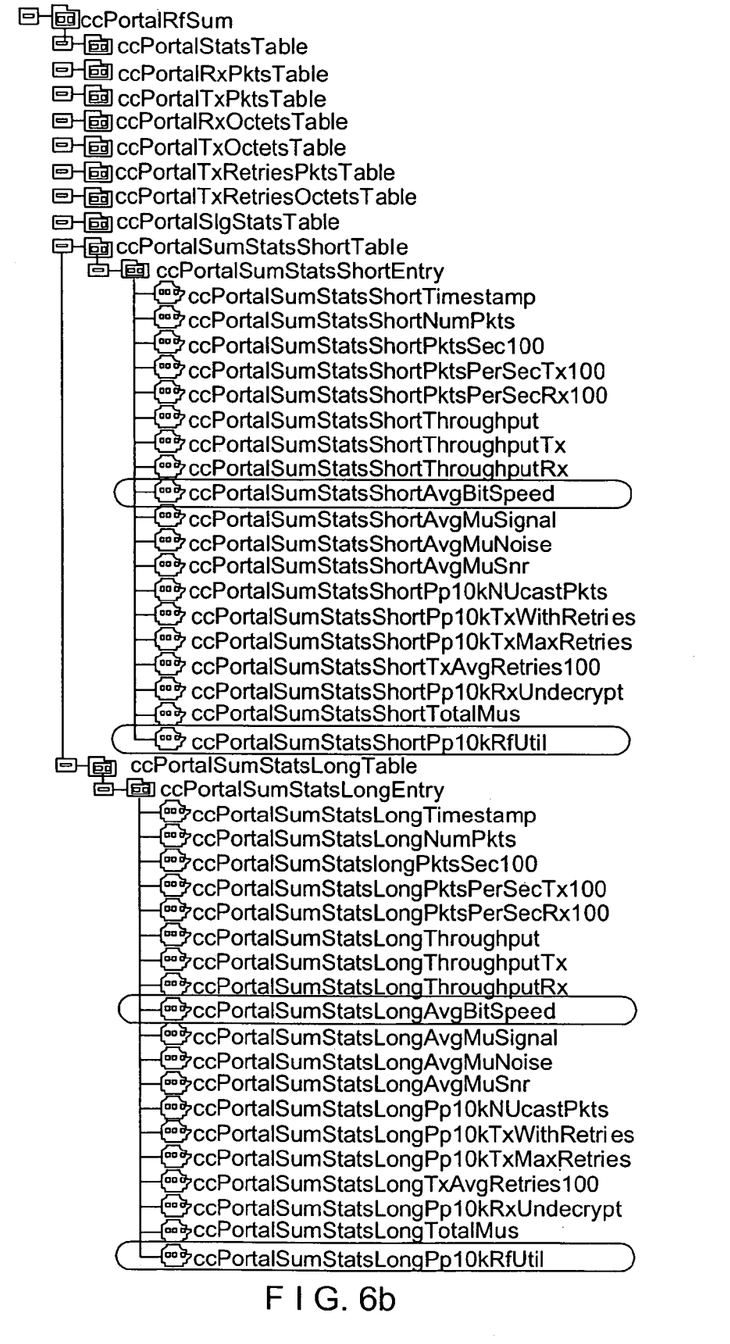
FIG. 6b is a screen shot of SNMP variables found in the ccPortal sub-tree displaying results calculated in accordance to the means proposed by the present invention.

FIG. 6b is a screen shot of SNMP variables found in the ccPortal sub-tree displaying results calculated in accordance to the means proposed by the present invention.

FIG. 6b displays in addition to the information comprised and displayed by FIG. 6a information calculated in accordance with the means of the present invention.

In the screen shot illustrated in FIG. 6b the average bit speed and the utilization calculated by means of the method described above are reported.

Figure 7:
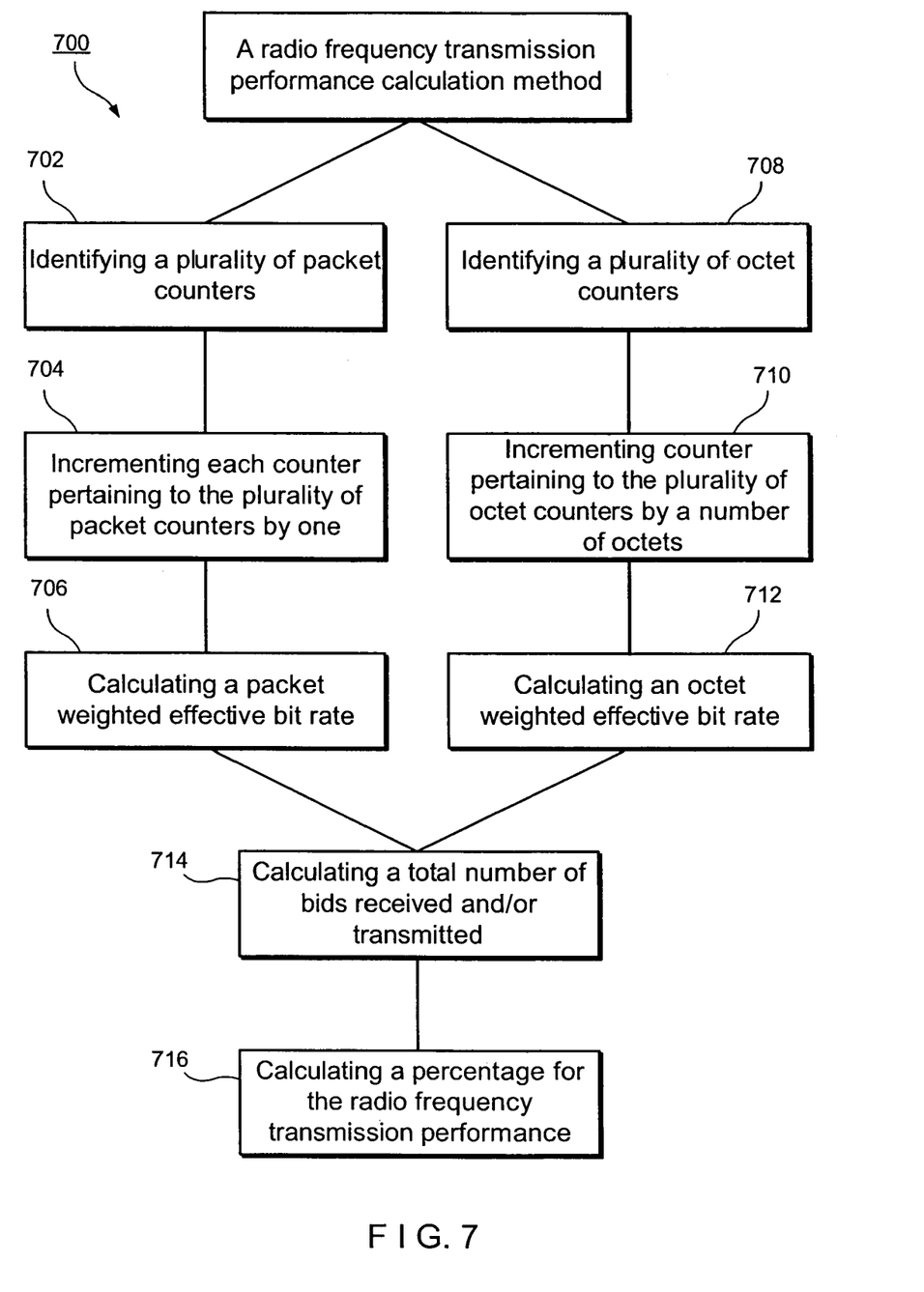
FIG. 7 is a flowchart representing the radio frequency exchange performance calculation method, in accordance with one aspect of the present invention.

FIG. 7 is a flowchart representing the radio frequency exchange performance calculation method, in accordance with one aspect of the present invention.

The radio frequency exchange performance calculation method in a WLAN 700 comprises the following succession of steps, steps that are interchangeable and can be performed in any order. By radio frequency exchange is meant RF communication that implies either transmission, reception, or both. A plurality of packet counters pertaining to each of a plurality of transmission speeds and to each of a plurality of components of the WLAN are identified in step 702. For each packet transmitted each appropriate packet counter is incremented by one in accordance to said speed a packet is transmitted, in step 704. Based on the information obtained in the previous steps 702 and 704 a packet weighted effective bit rate is calculated in step 706. A plurality of octet counters pertaining to each of a plurality of transmission speeds and to each of a plurality of components of the WLAN is identified in step 708. Each octet counter is incremented with the number of octets in the packet, in step 710. Based on the information obtained in the previous steps 708 and 710 an octet weighted effective bit rate is calculated in step 712. A total number of bits received and/or transmitted are calculated in step 714 and a percentage for the radio frequency transmission performance is calculated in step final step 716.

For method 700 illustrated in FIG. 7 the step of calculating a percentage for the radio frequency transmission performance 716 is performed by dividing the packet weighted effective bit rate by a total of bits moved through the radio medium. The step of calculating a percentage for the radio frequency transmission performance 716 can also be performed by dividing the octet-weighted effective bit rate by the total bits moved through the radio medium. The calculated percentage for the radio frequency transmission performance is reported using an aggregate measure.

One aggregate measure used to report the radio frequency transmission performance is utilization. The utilization is reported using a tree of standard tables, such as the ones illustrated in FIG. 6b.

The plurality of packet counters comprises a packet counter for each plurality of transmission speeds counted in the WLAN. The plurality of transmission speeds comprises one or any combination of speeds 1, 2, 3, 5.5, 6, 9, 11, 12, 18, 22, 24, 36, 48, and 54 M bits per second.

The plurality of octet counters comprises an octet packet counter for each plurality of transmission speeds counted in the WLAN. The plurality of transmission speeds comprises one or any combination of speeds 1, 2, 3, 5.5, 6, 9, 11, 12, 18, 22, 24, 36, 48, and 54 M bits per second. The plurality of transmission speeds is utilized by each portal, radio, switch, mobile unit, or WLAN sub-net comprised by the WLAN.

Figure 8:
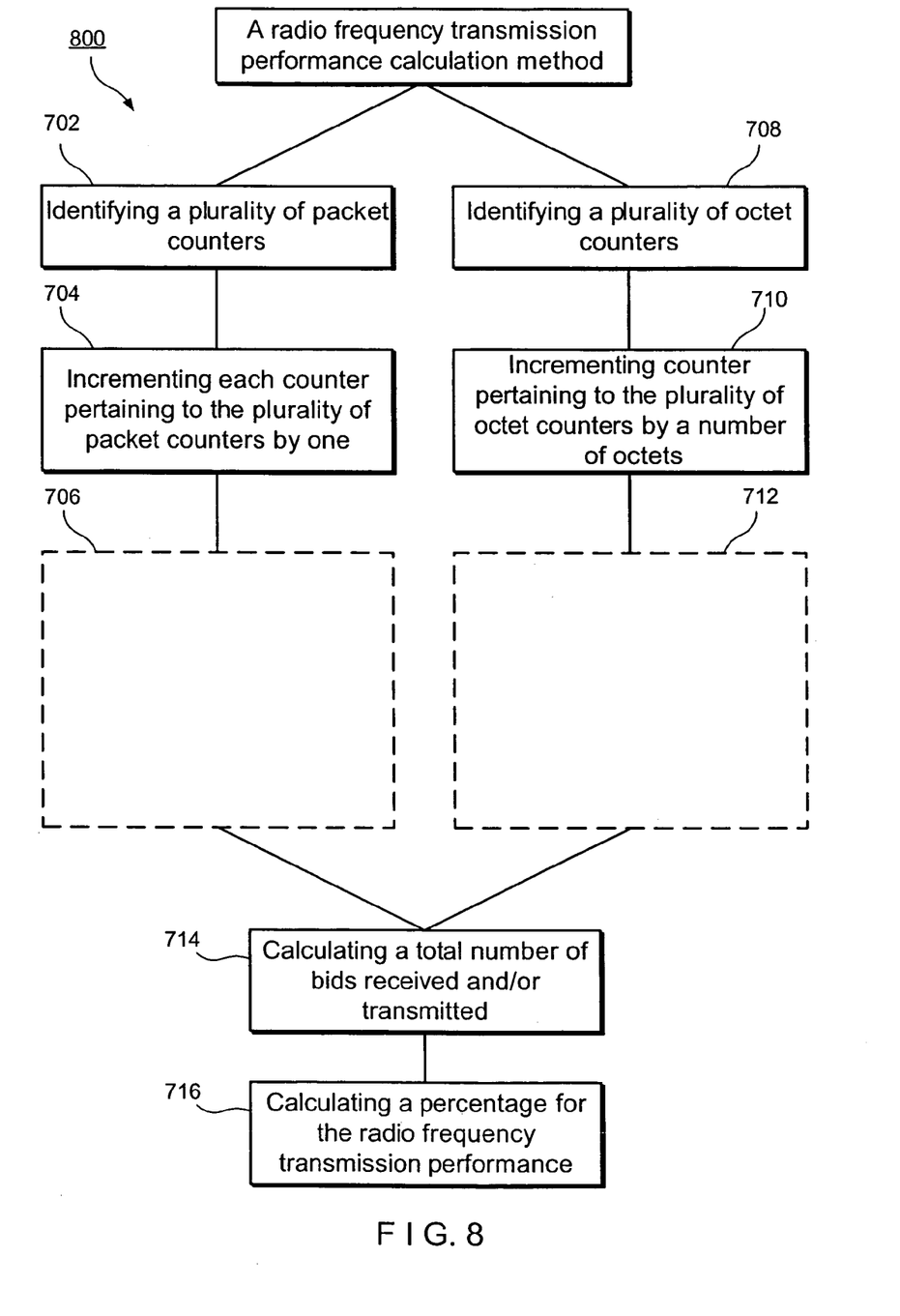
FIG. 8 further illustrates the radio frequency exchange performance calculation method, in accordance with another aspect of the present invention.

FIG. 8 further illustrates the radio frequency transmission performance calculation method, in accordance with another aspect of the present invention.

Step 706 of method 700 comprising calculating the packet weighted effective bit rate is illustrated as being performed by obtaining a plurality of products by multiplying a number of packets transmitted/received at a given data rate by said data rate in step 802, summing each of the plurality of products for all data rates in step 804, and obtaining the packet weighted effective bit rate by dividing the sum with the total of number of packets received/transmitted across all rates, in step 806.

Step 712 of method 700 comprising calculating the octet-weighted effective bit rate is illustrated as being performed by multiplying the number of packets transmitted/received at a given data rate by that data rate, in step 808; sum those products for all possible data rates 810; and divide that sum by the total number of packets across all rates. The resulting value is called "octet-weighted effective bit rate". This value is more accurate, since the prior takes no account of packet size.

Figure 9:
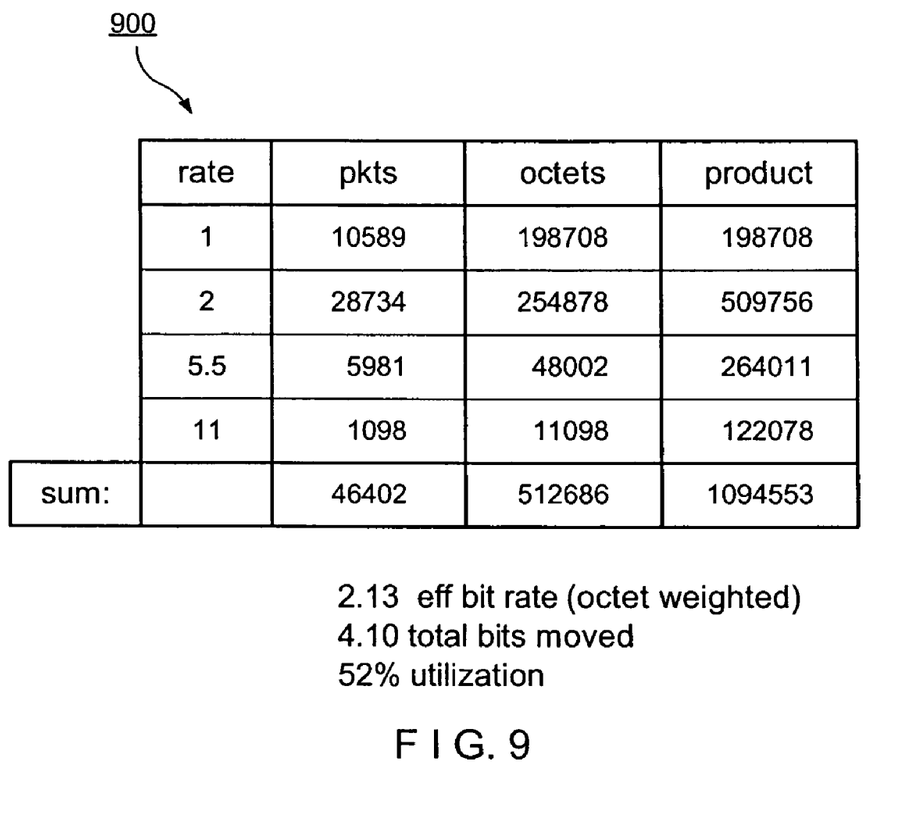
FIG. 9 illustrates an example implementation for the method of the present invention.

FIG. 9 illustrates an example implementation of the method in accordance with the present invention.

It is presumed in the example shown in FIG. 9 that the element in the wireless medium exchanges the data using the IEEE 802.11b standard. For example the data is exchanged with data rates 1, 2, 5.5, and 11 Mbt/sec. Table 900 illustrates in the second column the number of packets that are exchanged at each speed and the total number of data packets exchanged (either transmitted, received or both) by the element in the wireless medium. According to table 900 at the speed of 5.5 Mbits/sec a number of 5981 packets are exchanged. The third column of table 900 illustrates the actual number of octets exchanged, respectively the actual number of bits exchanged by the element in the wireless medium. The data in the third column of table 900 will always be larger than the data in column B, at least because the octet count is the sum of all bytes from all the packets exchanged by the element of the wireless medium. The octet count in the third column is summed to obtain the total octet count across all data rates. The forth column of table 900 exhibits a product between the data rate and the actual number of octets exchanged by the element of the wireless medium. The information in the forth column is summed taking into account all data rates. A division is performed between the sum of all products of forth column and the sum of all octets of the third column. The result of this division is the octet weighted effective bit rate, which for the example illustrated in FIG. 9 is 2.13. It is presuming that the total number of bits exchanged by the element of the wireless medium illustrated in this example across all data rates is 4.1 million bits. The total number of bits is calculated by with one million. The result of the division between the total bits exchanged by the element of the wireless medium across all data rates with the effective bit rate results yield the utilization of the wireless medium.

Figure 5:
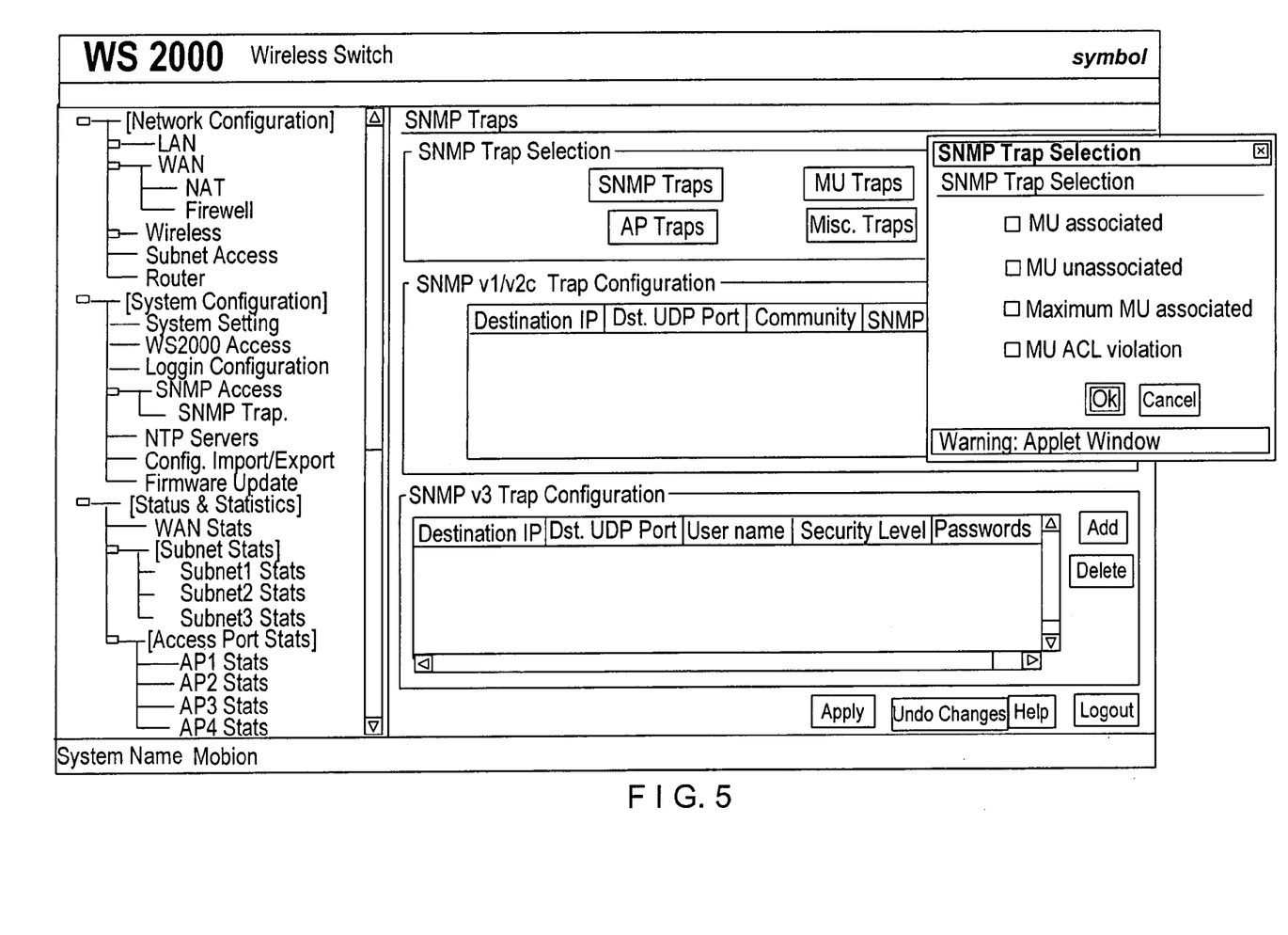
FIG. 5 illustrates an example of a SNMP trap configuration in a wireless switch.

As means of reporting the average speeds, the octet weighted average speeds and the utilization computed as shown in the example above, a variety of reporting tools are available in the industry. Example of displays facilitated on a computer screen by such reporting tools is shown in FIGS. 5 and 6. Traditionally these reporting tools used by network administrators to monitor the health of the network facilitate the reporting of variables such as timestamps, number of packets, packets per second, packets per second received or transmitted or both, throughput, etc.

For methods 700 and 800, represented in FIGS. 7 and 8, and the exemplary implementation of the method of FIG. 9, it is noted that utilization calculation can be performed: In a packet-weighted manner, octet-weighted manner, or both; for the data exchange referring to transmit only, receive only, or both; on a per-MU, per-Portal, per-WLAN, or per-switch basis; and over any arbitrary time-interval.

It is to be understood that the above description is intended to be illustrative and not restrictive. Many other embodiments will be apparent to one of skill in the art upon reviewing the above description. The scope of the invention should, therefore, be determined with reference to the appended claims, along with the full scope of equivalents which such claims are entitled.

What is claimed is:

1. A method, comprising:
   counting, for a prescribed time interval, a number of packets communicated at a plurality of data rates over a radio frequency medium to generate packet counts for the corresponding data rates;
   multiplying each of the packet counts by the corresponding data rate to generate packet products for each of the data rates;
   summing the packet products to generate a packet product total; and
   dividing the packet product total by a sum of the packet counts to generate a packet-weighted effective bit rate.

2. The method of claim 1, wherein the plurality of data rates include at least two of 1, 2, 5.5, 6, 9, 11, 12, 18, 22, 24, 36, 48 and 54 Mbps.

3. The method of claim 1, further comprising:
   determining, for the prescribed time interval, a total number of bits communicated over the radio frequency medium; and
   dividing the packet-weighted effective bit rate by the total number of bits to generate a utilization percentage.

4. The method of claim 3, further comprising:
   storing at least one of the packet counts, the packet products, the packet product total, the sum of the packet counts, the packet-weighted effective bit rate, the total number of bits communicated over the radio frequency medium and the utilization percentage as entries in a management information base (MIB).

5. The method of claim 4, further comprising:
providing the entries in the MIB to a simple network management protocol (SNMP) requestor.

6. The method of claim 1, wherein the packets are communicated on the radio frequency medium utilizing at least one of an IEEE 802.11a standard, an IEEE 802.11b standard and an IEEE 802.11g standard.

7. A method, comprising:
counting, during a prescribed time interval, a number of octets communicated over a radio frequency medium at a plurality of data rates to generate octet counts for the corresponding data rates;
multiplying each of the octet counts by the corresponding data rates to generate octet products for each of the data rates;
summing the octet products to generate an octet product total; and
dividing the octet product total by a sum of the octet counts to generate an octet-weighted effective bit rate.

8. The method of claim 7, wherein the plurality of data rates include at least two of 1, 2, 5.5, 6, 9, 11, 12, 18, 22, 24, 36, 48 and 54 Mbps.

9. The method of claim 7, further comprising:
determining, for the prescribed time interval, a total number of bits communicated over the radio frequency medium; and
dividing the octet-weighted effective bit rate by the total number of bits to generate a utilization percentage.

10. The method of claim 9, further comprising:
storing at least one of the octet counts, the octet products, the octet product total, the sum of the octet counts, the octet-weighted effective bit rate, the total number of bits communicated over the radio frequency medium and the utilization percentage as entries in a management information base (MIB).

11. The method of claim 10, further comprising:
providing the entries in the MIB for a simple network management protocol (SNMP) requestor.

12. The method of claim 7, wherein the packets are communicated on the radio frequency medium utilizing at least one of an IEEE 802.11a standard, an IEEE 802.11b standard and an IEEE 802.11g standard.

13. A device, comprising:
a counter array counting, for a prescribed time interval, a number of packets communicated at a plurality of data rates over a radio frequency medium to generate packet counts for the corresponding data rates; and
a processor multiplying each of the packet counts by the corresponding data rate to generate packet products for each of the data rates, the processor summing the packet products to generate a packet product total, the processor dividing the packet product total by a sum of the packet counts to generate a packet-weighted effective bit rate.

14. The device of claim 13, wherein the device is one of a portal, a radio, a switch and a mobile unit.

15. The device of claim 13, wherein the plurality of data rates include at least two of 1, 2, 5.5, 6, 9, 11, 12, 18, 22, 24, 36, 48 and 54 Mbps.

16. The device of claim 13, wherein the processor determines, for the prescribed time interval, a total number of bus communicated over the radio frequency medium and divides the packet-weighted effective bit rate by the total number of bits to generate a utilization percentage.

17. The device of claim 16, further comprising:
a memory storing a management information base (MIB), the MIB including entries corresponding to at least one of the packet counts, the packet products, the packet product total, the sum of the packet counts, the packet-weighted effective bit rate, the total number of bits communicated over the radio frequency medium and the utilization percentage.

18. The device of claim 17, wherein the processor provides the entries in the MIB to a simple network management protocol (SNMP) requestor.

19. The device of claim 16, further comprising:
a further counter counting, during the prescribed time interval, a number of octets communicated over the radio frequency medium at the plurality of data rates to generate octet counts for the corresponding data rates,
wherein the processor multiplies each of the octet counts by the corresponding data rates to generate octet products for each of the data rates,
wherein the processor sums the octet products to generate an octet product total and divides the octet product total by a sum of the octet counts to generate an octet-weighted effective bit rate, and
wherein the processor divides the octet-weighted effective bit rate by the total number of bits to generate a further utilization percentage.

20. The device of claim 13, wherein the packets are communicated on the radio frequency medium utilizing at least one of an IEEE 802.11a standard, an IEEE 802.11b standard and an IEEE 802.11g standard.

* * * * *

UNITED STATES PATENT AND TRADEMARK OFFICE
CERTIFICATE OF CORRECTION

| | | |
|---|---|---|
| PATENT NO. | : 7,430,198 B2 | Page 1 of 1 |
| APPLICATION NO. | : 11/138587 | |
| DATED | : September 30, 2008 | |
| INVENTOR(S) | : Mower et al. | |

It is certified that error appears in the above-identified patent and that said Letters Patent is hereby corrected as shown below:

IN THE DRAWINGS:

In Fig. 5, Sheet 4 of 9, under "System Configuration", Line 3, delete "Loggin" and insert -- Login --, therefor.

In Fig, 7, Sheet 7 of 9, for Tag "714", Line 2, delete "bids" and insert -- bits --, therefor.

In Fig. 8, Sheet 8 of 9, for Tag "714", Line 2, delete "bids" and insert -- bits --, therefor.

In Column 9, Line 56, delete "Mbt/sec." and insert -- Mbit/sec. --, therefor.

In Column 12, Line 15, in Claim 16, delete "bus" and insert -- bits --, therefor.

Signed and Sealed this
Fourth Day of October, 2011

David J. Kappos
*Director of the United States Patent and Trademark Office*